(12) United States Patent
Marsden et al.

(10) Patent No.: US 12,131,019 B2
(45) Date of Patent: Oct. 29, 2024

(54) VIRTUAL KEYBOARD ANIMATION

(71) Applicant: Apple Inc., Cupertino, CA (US)

(72) Inventors: Randal J. Marsden, Saratoga, CA (US); Wayne C. Westerman, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/716,980

(22) Filed: Apr. 8, 2022

(65) Prior Publication Data

US 2022/0229550 A1 Jul. 21, 2022

Related U.S. Application Data

(63) Continuation of application No. 16/410,990, filed on May 13, 2019, now Pat. No. 11,314,411, which is a continuation of application No. 14/603,269, filed on Jan. 22, 2015, now Pat. No. 10,289,302, which is a continuation of application No. 14/481,882, filed on Sep. 9, 2014, now abandoned.

(60) Provisional application No. 61/875,269, filed on Sep. 9, 2013.

(51) Int. Cl.
*G06F 3/0488* (2022.01)
*G06F 3/041* (2006.01)
*G06F 3/0482* (2013.01)
*G06F 3/04886* (2022.01)
*G06T 13/80* (2011.01)

(52) U.S. Cl.
CPC .......... *G06F 3/04886* (2013.01); *G06F 3/041* (2013.01); *G06F 3/0482* (2013.01); *G06F 3/0488* (2013.01); *G06T 13/80* (2013.01)

(58) Field of Classification Search
CPC .... G06F 3/04886; G06F 3/041; G06F 3/0482; G06F 3/0488; G06T 13/80
See application file for complete search history.

(56) References Cited

U.S. PATENT DOCUMENTS

| 4,725,694 A | 2/1988 | Auer et al. |
| 4,805,222 A | 2/1989 | Young et al. |
| 5,404,458 A | 4/1995 | Zetts |
| 5,416,498 A | 5/1995 | Grant |

(Continued)

FOREIGN PATENT DOCUMENTS

| CN | 1075222 A | 8/1993 |
| CN | 2662340 Y | 12/2004 |

(Continued)

OTHER PUBLICATIONS

Devlin Medical, CleanKey Keyboard, www.DevlinMedical.co.uk, Hampshire, UK, Nov. 6, 2006, 1 page.

(Continued)

*Primary Examiner* — Xuyang Xia
(74) *Attorney, Agent, or Firm* — Morgan, Lewis & Bockius LLP

(57) ABSTRACT

A computing device with a touch-sensitive display displays a menu for a touch-sensitive keyboard, the menu including a plurality of keyboard settings. In response to a first input in the menu, adjusting a first setting of a plurality of keyboard settings for a first application. In response to a second input in the menu, adjusting a second setting of the plurality of keyboard settings for a second application distinct from the first application.

24 Claims, 4 Drawing Sheets

(56) References Cited

U.S. PATENT DOCUMENTS

| | | |
|---|---|---|
| 6,029,578 A | 2/2000 | Weil et al. |
| 6,396,483 B1 | 5/2002 | Hiller |
| 6,492,979 B1 | 12/2002 | Kent et al. |
| 6,504,530 B1 | 1/2003 | Wilson et al. |
| 6,512,838 B1 | 1/2003 | Rafii et al. |
| 6,525,717 B1 | 2/2003 | Tang |
| 6,563,492 B1 | 5/2003 | Furuya |
| 6,611,253 B1 | 8/2003 | Cohen |
| 6,625,460 B1 | 9/2003 | Patil |
| 6,650,318 B1 | 11/2003 | Arnon |
| 6,657,616 B2 | 12/2003 | Sims |
| 6,707,448 B1 | 3/2004 | Kunimatsu et al. |
| 6,762,749 B1 | 7/2004 | Gouzman et al. |
| 7,257,528 B1 | 8/2007 | Ritchie et al. |
| 7,309,829 B1 | 12/2007 | Ludwig |
| 7,339,580 B2 | 3/2008 | Westerman et al. |
| 7,382,358 B2 | 6/2008 | Kushler et al. |
| 7,499,039 B2 | 3/2009 | Roberts |
| 7,554,529 B2 | 6/2009 | Kotipalli |
| 7,557,312 B2 | 7/2009 | Clark et al. |
| 7,659,885 B2 | 2/2010 | Kraus et al. |
| 7,663,607 B2 | 2/2010 | Hotelling et al. |
| 7,768,501 B1 | 8/2010 | Maddalozzo, Jr. et al. |
| 7,813,774 B2 | 10/2010 | Perez-Noguera |
| 7,958,459 B1 | 6/2011 | Mahmood et al. |
| 8,019,390 B2 | 9/2011 | Sindhu |
| 8,350,820 B2 | 1/2013 | Deslippe et al. |
| 8,384,683 B2 | 2/2013 | Luo |
| 8,390,572 B2 | 3/2013 | Marsden et al. |
| 8,471,857 B1 | 6/2013 | Moore |
| 8,487,897 B1 | 7/2013 | Hsieh |
| 8,624,841 B2 | 1/2014 | Kim et al. |
| 8,716,585 B2 | 5/2014 | Ludwig |
| 9,030,424 B2 | 5/2015 | Shih et al. |
| 9,489,086 B1 | 11/2016 | Marsden et al. |
| 9,535,603 B2 | 1/2017 | Andersen |
| 10,013,163 B2 | 7/2018 | Schönleben et al. |
| 10,048,861 B2 | 8/2018 | Bozzini et al. |
| 2002/0005108 A1 | 1/2002 | Ludwig |
| 2002/0005111 A1 | 1/2002 | Ludwig |
| 2002/0033285 A1 | 3/2002 | Afanasiev |
| 2002/0033795 A1 | 3/2002 | Shahoian et al. |
| 2002/0095586 A1 | 7/2002 | Doyle et al. |
| 2002/0130848 A1 | 9/2002 | Sims |
| 2002/0140667 A1 | 10/2002 | Horiki |
| 2003/0063073 A1 | 4/2003 | Geaghan et al. |
| 2003/0071858 A1 | 4/2003 | Morohoshi |
| 2003/0122784 A1 | 7/2003 | Shkolnikov |
| 2003/0206162 A1 | 11/2003 | Roberts |
| 2003/0235452 A1 | 12/2003 | Kraus et al. |
| 2004/0004559 A1 | 1/2004 | Rast |
| 2004/0104896 A1 | 6/2004 | Suraqui |
| 2004/0108995 A1 | 6/2004 | Hoshino et al. |
| 2004/0125086 A1 | 7/2004 | Hagermoser et al. |
| 2004/0130575 A1 | 7/2004 | Tai et al. |
| 2004/0140956 A1 | 7/2004 | Kushler et al. |
| 2004/0225416 A1 | 11/2004 | Kubota et al. |
| 2005/0030291 A1 | 2/2005 | Yanagisawa |
| 2005/0059418 A1 | 3/2005 | Northcutt |
| 2005/0063757 A1 | 3/2005 | Sugimura et al. |
| 2005/0104867 A1 | 5/2005 | Westerman et al. |
| 2005/0114115 A1 | 5/2005 | Karidis et al. |
| 2005/0114825 A1 | 5/2005 | Leung et al. |
| 2005/0120870 A1 | 6/2005 | Ludwig |
| 2005/0121980 A1 | 6/2005 | Bruwer |
| 2005/0122313 A1 | 6/2005 | Ashby |
| 2005/0122322 A1 | 6/2005 | Furuya et al. |
| 2005/0162402 A1 | 7/2005 | Watanachote |
| 2005/0179565 A1 | 8/2005 | Mase et al. |
| 2005/0190970 A1 | 9/2005 | Griffin |
| 2005/0210020 A1 | 9/2005 | Gunn et al. |
| 2005/0225538 A1 | 10/2005 | Verhaegh |
| 2005/0246652 A1 | 11/2005 | Morris |
| 2006/0066590 A1 | 3/2006 | Ozawa et al. |
| 2006/0084482 A1 | 4/2006 | Saila |
| 2006/0088752 A1 | 4/2006 | Sakano et al. |
| 2006/0097991 A1 | 5/2006 | Hotelling et al. |
| 2006/0114238 A1 | 6/2006 | Wong et al. |
| 2006/0132457 A1 | 6/2006 | Rimas-Ribikauskas et al. |
| 2006/0139312 A1 | 6/2006 | Sinclair, II et al. |
| 2006/0152497 A1 | 7/2006 | Rekimoto |
| 2006/0152499 A1 | 7/2006 | Roberts |
| 2006/0161870 A1 | 7/2006 | Hotelling et al. |
| 2006/0180450 A1 | 8/2006 | Clark et al. |
| 2006/0181520 A1 | 8/2006 | Ikegawa |
| 2006/0192763 A1 | 8/2006 | Ziemkowski |
| 2006/0197753 A1 | 9/2006 | Hotelling |
| 2006/0232558 A1 | 10/2006 | Chien |
| 2006/0238503 A1 | 10/2006 | Smith et al. |
| 2006/0265648 A1 | 11/2006 | Rainisto et al. |
| 2006/0274042 A1 | 12/2006 | Krah et al. |
| 2006/0274051 A1 | 12/2006 | Longe et al. |
| 2006/0274920 A1 | 12/2006 | Tochikubo et al. |
| 2006/0279548 A1 | 12/2006 | Geaghan |
| 2006/0284858 A1 | 12/2006 | Rekimoto |
| 2007/0024593 A1 | 2/2007 | Schroeder |
| 2007/0040813 A1 | 2/2007 | Kushler et al. |
| 2007/0047702 A1 | 3/2007 | Newell et al. |
| 2007/0060131 A1 | 3/2007 | Wilson |
| 2007/0091070 A1 | 4/2007 | C. Larsen et al. |
| 2007/0096930 A1 | 5/2007 | Cardoso |
| 2007/0118876 A1 | 5/2007 | Singh et al. |
| 2007/0120762 A1 | 5/2007 | O'Gorman |
| 2007/0120832 A1 | 5/2007 | Saarinen et al. |
| 2007/0139382 A1 | 6/2007 | Kotipalli |
| 2007/0139395 A1 | 6/2007 | Westerman et al. |
| 2007/0216658 A1 | 9/2007 | Rainisto |
| 2007/0229466 A1 | 10/2007 | Peng et al. |
| 2007/0229476 A1 | 10/2007 | Huh |
| 2007/0236478 A1 | 10/2007 | Geaghan et al. |
| 2007/0247316 A1 | 10/2007 | Wildman et al. |
| 2007/0247429 A1 | 10/2007 | Westerman |
| 2007/0273561 A1 | 11/2007 | Philipp |
| 2007/0294263 A1 | 12/2007 | Punj et al. |
| 2008/0018614 A1 | 1/2008 | Rekimoto |
| 2008/0042978 A1 | 2/2008 | Perez-Noguera |
| 2008/0042989 A1 | 2/2008 | Westerman |
| 2008/0122796 A1 | 5/2008 | Jobs et al. |
| 2008/0136587 A1 | 6/2008 | Orr |
| 2008/0146082 A1 | 6/2008 | Lin et al. |
| 2008/0150905 A1 | 6/2008 | Grivna et al. |
| 2008/0170046 A1 | 7/2008 | Rimon et al. |
| 2008/0225006 A1 | 9/2008 | Ennadi |
| 2008/0237021 A1 | 10/2008 | Struve |
| 2008/0270558 A1 | 10/2008 | Ma |
| 2008/0273013 A1 | 11/2008 | Levine et al. |
| 2008/0281923 A1 | 11/2008 | Barchi |
| 2008/0289887 A1 | 11/2008 | Flint et al. |
| 2008/0309519 A1 | 12/2008 | Bengtsson et al. |
| 2009/0002217 A1 | 1/2009 | Kryze et al. |
| 2009/0009482 A1 | 1/2009 | McDermid |
| 2009/0016000 A1 | 1/2009 | Kobayashi |
| 2009/0045700 A1 | 2/2009 | Sasaki et al. |
| 2009/0046110 A1 | 2/2009 | Sadler et al. |
| 2009/0051447 A1 | 2/2009 | McCracken et al. |
| 2009/0073128 A1 | 3/2009 | Marsden |
| 2009/0091458 A1 | 4/2009 | Deutsch |
| 2009/0207574 A1 | 8/2009 | Chen et al. |
| 2009/0225041 A1 | 9/2009 | Kida et al. |
| 2009/0226091 A1 | 9/2009 | Goldsmith et al. |
| 2009/0237254 A1 | 9/2009 | Munro et al. |
| 2009/0237359 A1 | 9/2009 | Kim et al. |
| 2009/0273477 A1 | 11/2009 | Barnhill |
| 2009/0273571 A1 | 11/2009 | Bowens |
| 2009/0282917 A1 | 11/2009 | Acar |
| 2009/0284476 A1 | 11/2009 | Bull et al. |
| 2009/0307623 A1 | 12/2009 | Agarawala et al. |
| 2010/0013852 A1* | 1/2010 | Liu .................. G06F 3/04886 345/592 |
| 2010/0020043 A1 | 1/2010 | Park et al. |
| 2010/0042827 A1 | 2/2010 | Pratt et al. |
| 2010/0045705 A1 | 2/2010 | Vertegaal et al. |
| 2010/0060585 A1 | 3/2010 | Chiu |
| 2010/0064244 A1 | 3/2010 | Kilpatrick, II et al. |

(56) References Cited

U.S. PATENT DOCUMENTS

| | | |
|---|---|---|
| 2010/0065640 A1 | 3/2010 | Maeda et al. |
| 2010/0081476 A1 | 4/2010 | Markiewicz et al. |
| 2010/0085382 A1 | 4/2010 | Lundqvist et al. |
| 2010/0101921 A1 | 4/2010 | Howie et al. |
| 2010/0103139 A1 | 4/2010 | Soo et al. |
| 2010/0134415 A1 | 6/2010 | Iwase et al. |
| 2010/0153879 A1 | 6/2010 | Rimas-Ribikauskas et al. |
| 2010/0177057 A1 | 7/2010 | Flint et al. |
| 2010/0194692 A1 | 8/2010 | Orr et al. |
| 2010/0220061 A1 | 9/2010 | Bos et al. |
| 2010/0251161 A1 | 9/2010 | Fong et al. |
| 2010/0323762 A1 | 12/2010 | Sindhu |
| 2011/0037734 A1 | 2/2011 | Pance et al. |
| 2011/0043475 A1 | 2/2011 | Rigazio et al. |
| 2011/0050576 A1 | 3/2011 | Forutanpour et al. |
| 2011/0055753 A1 | 3/2011 | Horodezky et al. |
| 2011/0068930 A1 | 3/2011 | Wildman et al. |
| 2011/0126141 A1 | 5/2011 | King et al. |
| 2011/0148770 A1 | 6/2011 | Adamson et al. |
| 2011/0201387 A1 | 8/2011 | Paek et al. |
| 2011/0221685 A1 | 9/2011 | Lee et al. |
| 2011/0227740 A1 | 9/2011 | Wohltjen |
| 2011/0248914 A1 | 10/2011 | Sherr |
| 2011/0316703 A1 | 12/2011 | Butler et al. |
| 2011/0316784 A1 | 12/2011 | Bisutti et al. |
| 2012/0056814 A1 | 3/2012 | Sudo |
| 2012/0062382 A1 | 3/2012 | Taneff |
| 2012/0075192 A1 | 3/2012 | Marsden et al. |
| 2012/0075193 A1 | 3/2012 | Marsden et al. |
| 2012/0112906 A1 | 5/2012 | Borke et al. |
| 2012/0113028 A1 | 5/2012 | Marsden et al. |
| 2012/0117506 A1 | 5/2012 | Koch et al. |
| 2012/0127071 A1 | 5/2012 | Jitkoff et al. |
| 2012/0133589 A1 | 5/2012 | Marsden et al. |
| 2012/0166995 A1 | 6/2012 | McAleer |
| 2012/0167170 A1 | 6/2012 | Shi et al. |
| 2012/0206384 A1 | 8/2012 | Marsden et al. |
| 2012/0251161 A1 | 10/2012 | Fukami et al. |
| 2012/0260207 A1 | 10/2012 | Treskunov et al. |
| 2012/0306758 A1 | 12/2012 | Marsden et al. |
| 2013/0021248 A1 | 1/2013 | Eleftheriou |
| 2013/0088439 A1 | 4/2013 | Shih et al. |
| 2013/0093715 A1 | 4/2013 | Marsden et al. |
| 2013/0106699 A1* | 5/2013 | Babatunde ............ G06F 3/0233 345/168 |
| 2013/0187775 A1 | 7/2013 | Marsden et al. |
| 2013/0222247 A1 | 8/2013 | Liu et al. |
| 2013/0222416 A1 | 8/2013 | Kim et al. |
| 2013/0257732 A1 | 10/2013 | Duffield |
| 2013/0265273 A1 | 10/2013 | Marsden et al. |
| 2013/0297289 A1* | 11/2013 | Clow ...................... G06F 40/58 704/8 |
| 2013/0307784 A1 | 11/2013 | Matsuzawa et al. |
| 2013/0332871 A1 | 12/2013 | Bucur et al. |
| 2013/0335402 A1 | 12/2013 | Eriksson et al. |
| 2014/0028624 A1 | 1/2014 | Marsden et al. |
| 2014/0035824 A1 | 2/2014 | Bernstein et al. |
| 2014/0111430 A1 | 4/2014 | Shima |
| 2014/0164975 A1* | 6/2014 | Kang .................. G06F 3/04845 715/773 |
| 2014/0195979 A1 | 7/2014 | Branton et al. |
| 2015/0049059 A1 | 2/2015 | Zadesky et al. |
| 2015/0067571 A1 | 3/2015 | Marsden |
| 2015/0108887 A1 | 4/2015 | Linson et al. |
| 2015/0324116 A1 | 11/2015 | Marsden et al. |
| 2016/0034131 A1 | 2/2016 | Kosaka |
| 2017/0003876 A1 | 1/2017 | Marsden |
| 2017/0068448 A1 | 3/2017 | Ghassabian |
| 2017/0185287 A1 | 6/2017 | Unruh et al. |
| 2018/0081539 A1 | 3/2018 | Ghassabian |
| 2019/0286317 A1 | 9/2019 | Marsden |
| 2020/0004416 A1 | 1/2020 | Marsden et al. |
| 2021/0132796 A1 | 5/2021 | Marsden |

FOREIGN PATENT DOCUMENTS

| | | | |
|---|---|---|---|
| CN | 1666170 A | 9/2005 | |
| CN | 1864125 A | 11/2006 | |
| CN | 101036105 A | 9/2007 | |
| CN | 101150618 A * | 3/2008 | ......... G06F 3/04883 |
| CN | 103186369 A * | 7/2013 | ........... G06F 3/0416 |
| EP | 02585597 A2 | 3/1988 | |
| JP | 63311521 A | 12/1988 | |
| JP | H01-147584 A | 6/1989 | |
| JP | 07-306752 A | 11/1995 | |
| JP | 10-208110 | 8/1998 | |
| JP | 11-085352 | 3/1999 | |
| JP | 11-136116 | 5/1999 | |
| JP | 2002297316 A | 10/2002 | |
| JP | 2004265383 A | 9/2004 | |
| JP | 2004-341813 A | 12/2004 | |
| JP | 2005204251 A | 7/2005 | |
| JP | 2005531861 A | 10/2005 | |
| JP | 2006127488 A | 5/2006 | |
| JP | 2007-184006 A | 7/2006 | |
| JP | 2006323589 A | 11/2006 | |
| JP | 2007-184008 A | 7/2007 | |
| JP | 2007-317201 A | 12/2007 | |
| JP | 2007-538299 A | 12/2007 | |
| JP | 2008-544352 A | 12/2008 | |
| JP | 2009-520271 A | 5/2009 | |
| JP | 2010-066899 A | 3/2010 | |
| KR | 20040106552 A | 12/2004 | |
| KR | 20090060888 A | 6/2009 | |
| KR | 20090101741 A | 9/2009 | |
| KR | 10-2010-0012321 A | 2/2010 | |
| KR | 10-2010-0029421 A | 3/2010 | |
| KR | 20100029026 A | 3/2010 | |
| KR | 2010-0065640 A | 6/2010 | |
| WO | WO 2003/027826 A1 | 4/2003 | |
| WO | WO 2006/039033 A2 | 4/2006 | |
| WO | WO 2006/088752 A2 | 8/2006 | |
| WO | WO 2006/133018 A2 | 12/2006 | |
| WO | WO 2007/144014 A1 | 12/2007 | |
| WO | WO 2015/108887 A1 | 7/2015 | |

OTHER PUBLICATIONS

Fu, "Touch Keyboard," Tianjin Funa Yuanchuang Technology Co Ltd, Jul. 4, 2012, 55 pages.
Office Action dated Jul. 12, 2011, received in U.S. Appl. No. 12/234,053 (5962), 15 pages.
Final Office Action dated Dec. 8, 2011, received in U.S. Appl. No. 12/234,053 (5962), 20 pages.
Office Action dated Jun. 1, 2012, received in U.S. Appl. No. 12/234,053 (5962), 18 pages.
Notice of Allowance dated Sep. 17, 2012, received in U.S. Appl. No. 12/234,053 (5962), 7 pages.
Patent, dated Mar. 28, 2017, received in Canadian Patent Application No. 2,698,737 (5962CA), which corresponds with U.S. Appl. No. 12/234,053, 3 pages.
Office Action dated Nov. 2, 2011, received in Chinese Patent Application No. 200880116618.7 (5962CN), which corresponds to U.S. Appl. No. 12/234,053, 2 pages.
Office Action dated Apr. 24, 2012, received in Chinese Patent Application No. 200880116618.7 (5962CN), which corresponds to U.S. Appl. No. 12/234,053, 7 pages.
Office Action dated Nov. 16, 2012, received in Chinese Patent Application No. 200880116618.7 (5962CN), which corresponds to U.S. Appl. No. 12/234,053, 7 pages.
Office Action dated May 9, 2013, received in Chinese Patent Application No. 200880116618.7 (5962CN), which corresponds to U.S. Appl. No. 12/234,053, 6 pages.
Office Action, dated Mar. 20, 2017, received in Chinese Patent Application No. 201510063398.8 (5962CN01), which corresponds with U.S. Appl. No. 12/234,053, 4 pages.
Office Action, dated Mar. 7, 2018, received in Chinese Patent Application No. 201510063398.8 (5962CN01), which corresponds with U.S. Appl. No. 12/234,053, 4 pages.

(56) References Cited

OTHER PUBLICATIONS

Patent, dated May 22, 2018, received in Chinese Patent Application No. 201510063398.8 (5962CN01), which corresponds with U.S. Appl. No. 12/234,053, 4 pages.
Office Action, dated Nov. 8, 2012, received in European Patent Application No. 08 832 204.5 (5962EP), which corresponds to U.S. Appl. No. 12/234,053, 5 pages.
Office Action, dated Nov. 4, 2017, received in European Patent Application No. 08 832 204.5 (5962EP), which corresponds to U.S. Appl. No. 12/234,053, 7 pages.
Office Action, dated Jun. 9, 2017, received in Indian Patent Application No. 2671/DELNP/2010 (5962IN), which corresponds to U.S. Appl. No. 12/234,053, 7 pages.
Patent, dated Jul. 23, 2021, received in Indian Patent Application No. 2671/DELNP/2010 (5962IN), which corresponds to U.S. Appl. No. 12/234,053, 4 pages.
Office Action, dated Aug. 21, 2012, received in Japanese Patent Application No. 2010-525997 (5962JP), which corresponds to U.S. Appl. No. 12/234,053, 9 pages.
Final Office Action, dated Jan. 22, 2013, received in Japanese Patent Application No. 2010-525997 (5962JP), which corresponds to U.S. Appl. No. 12/234,053, 10 pages.
Notice of Allowance, dated Aug. 3, 2015, received in Japanese Patent Application No. 2010-525997 (5962JP), which corresponds with U.S. Appl. No. 12/234,053, 3 pages.
Office Action, dated Jun. 27, 2016, received in Japanese Patent Application No. 2015-135493 (5962JP01), which corresponds with U.S. Appl. No. 12/234,053, 4 pages.
Notice of Allowance, dated Feb. 1, 2017, received in Japanese Patent Application No. 2015-135493 (5962JP01), which corresponds with U.S. Appl. No. 13/171,124, 5 pages.
Patent, dated Mar. 23, 2017, received in Japanese Patent Application No. 2015-135493 (5962JP01), which corresponds with U.S. Appl. No. 13/171,124, 2 pages.
Office Action, dated Nov. 26, 2014, received in KR1020107008557 (5962KR), which corresponds to U.S. Appl. No. 12/234,053, 13 pages.
Letters Patent, dated Dec. 14, 2015, received in Korean Patent Application No. 10-20103-7008557 (5962KR), which corresponds to U.S. Appl. No. 12/234,053, 2 pages.
Office Action dated May 19, 2014, received in U.S. Appl. No. 13/442,855 (5963), 18 pages.
Final Office Action dated Dec. 9, 2014, received in U.S. Appl. No. 13/442,855 (5963), 31 pages.
Office Action, dated Jul. 22, 2015, received in U.S. Appl. No. 13/442,855 (5963), 15 pages.
Notice of Allowance, dated May 24, 2016, received in U.S. Appl. No. 13/442,855 (5963), 12 pages.
Office Action dated Aug. 26, 2013, received in U.S. Appl. No. 13/171,124 (5964), 12 pages.
Final Office Action dated May 29, 2014, received in U.S. Appl. No. 13/171,124 (5964), 11 pages.
Notice of Allowance dated Jan. 5, 2015, received in U.S. Appl. No. 13/171,124 (5964), 8 pages.
Office Action dated Mar. 12, 2015, received in U.S. Appl. No. 13/171,124 (5964), 13 pages.
Final Office Action, dated Oct. 7, 2015, received in U.S. Appl. No. 13/171,124 (5964), 12 pages.
Notice of Allowance, dated Feb. 18, 2016, received in U.S. Appl. No. 13/171,124 (5964), 7 pages.
Office Action dated May 19, 2016, received in U.S. Appl. No. 13/171,124 (5964), 13 pages.
Office Action, dated Apr. 26, 2017, received in Canadian Patent Application No. 2,804,014 (5964CA), which corresponds with U.S. Appl. No. 13/171,124, 5 pages.
Notice of Allowance, dated Feb. 3, 2016, received in Chinese Patent Application No. 201180039270.8 (5964CN), which corresponds with U.S. Appl. No. 13/171,124, 2 pages.
Office Action, dated Apr. 28, 2015, received in Chinese Patent Application No. 201180039270.8 (5964CN), which corresponds with U.S. Appl. No. 13/171,124, 2 pages.
Certificate of Patent, dated Mar. 16, 2016, received in Chinese Patent Application No. 201180039270.8 (5964CN), which corresponds with U.S. Appl. No. 13/171,124, 2 pages.
Office Action, dated Feb. 25, 2014, received in Japanese Patent Application No. JP 2013-518583 (5964JP), which corresponds to U.S. Appl. No. 13/171,124, 5 pages.
Office Action, dated Oct. 28, 2016, received in Japanese Patent Application No. 2015-233734 (5964JP01), which corresponds with U.S. Appl. No. 13/171,124, 3 pages.
Office Action, dated May 16, 2012, received in U.S. Appl. No. 13/365,719 (5965), 20 pages.
Final Office Action, dated Oct. 19, 2012, received in U.S. Appl. No. 13/365,719 (5965), 9 pages.
Notice of Allowance, dated Nov. 13, 2012, received in U.S. Appl. No. 13/365,719 (5965), 7 pages.
Office Action dated May 6, 2014, received in U.S. Appl. No. 13/308,416 (5966), 19 pages.
Final Office Action, dated Jan. 30, 2015, received in U.S. Appl. No. 13/308,416 (5966), 38 pages.
Notice of Allowance dated Jun. 30, 2015, received in U.S. Appl. No. 13/308,416 (5966), 9 pages.
Patent Certificate, dated Jun. 8, 2016, received in Chinese Patent Application No. 200880116618.7 (5966CN), which corresponds to U.S. Appl. No. 13/308,416, 2 pages.
Office Action, dated Oct. 29, 2018, received in Chinese Patent Application 201610489534.4 (5966CN01), which corresponds with U.S. Appl. No. 13/308,416, 4 pages.
Office Action, dated May 14, 2019, received in Chinese Patent Application 201610489534.4 (5966CN01), which corresponds with U.S. Appl. No. 13/308,416, 3 pages.
Office Action, dated Aug. 28, 2019, received in Chinese Patent Application 201610489534.4 (5966CN01), which corresponds with U.S. Appl. No. 13/308,416, 4 pages.
Notice of Allowance, dated Oct. 31, 2019, received in Chinese Patent Application No. 201610489534.4 (5966CN01), which corresponds with U.S. Appl. No. 13/308,416, 3 pages.
Patent, dated Dec. 13, 2019, received in Chinese Patent Application No. 201610489534.4 (5966CN01), which corresponds with U.S. Appl. No. 13/308,416, 6 pages.
Office Action, dated Aug. 19, 2014, received in Japanese Patent Application No. 2013-542153 (5966JP), which corresponds to U.S. Appl. No. 13/308,416, 5 pages.
Office Action, dated Feb. 3, 2017, received in Japanese Patent Application No. 2015-142348 (5966JP01), which corresponds with U.S. Appl. No. 13/308,416, 6 pages.
Patent, dated Sep. 17, 2017, received in Japanese Patent Application No. 2015-142348 (5966JP01), which corresponds with U.S. Appl. No. 13/308,416, 2 pages.
Office Action, dated Nov. 12, 2014, received in Korean Patent Application No. 2013-7016964 (5966KR), which corresponds to U.S. Appl. No. 13/308,416, 3 pages.
Notice of Allowance, dated Jun. 30, 2015, received in Korean Patent Application No. 2013-7016964 (5966KR), which corresponds to U.S. Appl. No. 13/308,416, 8 pages.
Letters Patent, dated Dec. 14, 2015, received in Korean Patent Application No. 2013-7016964 (5966KR), which corresponds to U.S. Appl. No. 13/308,416, 3 pages.
Office Action dated May 2, 2014, received in U.S. Appl. No. 13/308,428 (5967), 12 pages.
Final Office Action dated Dec. 22, 2014, received in U.S. Appl. No. 13/308,428 (5967), 29 pages.
Office Action, dated May 15, 2015, received in U.S. Appl. No. 13/308,428 (5967), 26 pages.
Office Action, dated Nov. 18, 2015, received in U.S. Appl. No. 13/308,428 (5967), 25 pages.
Final Office Action, dated Nov. 24, 2015, received in U.S. Appl. No. 13/308,428 (5967), 26 pages.
Notice of Allowance, dated Aug. 1, 2018, received in U.S. Appl. No. 13/308,428 (5967), 7 pages.

(56) References Cited

OTHER PUBLICATIONS

Office Action dated May 16, 2014, received in U.S. Appl. No. 13/355,450 (5968), 12 pages.
Final Office Action dated Nov. 7, 2014, received in U.S. Appl. No. 13/355,450 (5968), 22 pages.
Notice of Allowance, dated Apr. 23, 2015, received in U.S. Appl. No. 13/355,450 (5968), 12 pages.
Office Action dated Jan. 27, 2014, received in U.S. Appl. No. 13/506,342 (5969), 13 pages.
Notice of Allowance dated Nov. 21, 2014, received in U.S. Appl. No. 13/506,342 (5969), 8 pages.
Notice of Allowance dated Feb. 23, 2015, received in U.S. Appl. No. 13/506,342 (5969), 5 pages.
Notice of Allowance, dated May 15, 2015, received in U.S. Appl. No. 13/506,342 (5969), 8 pages.
Notice of Allowance, dated Jun. 29, 2015, received in U.S. Appl. No. 13/506,342 (5969), 8 pages.
Office Action dated Jun. 18, 2013, received in U.S. Appl. No. 13/485,802 (5970), 11 pages.
Office Action dated Aug. 10, 2012, received in U.S. Appl. No. 13/485,802 (5970), 8 pages.
Final Office Action dated Dec. 10, 2012, received in U.S. Appl. No. 13/485,802 (5970), 11 pages.
Office Action dated Feb. 27, 2014, received in U.S. Appl. No. 13/747,469 (5971), 8 pages.
Office Action dated Sep. 25, 2014, received in U.S. Appl. No. 14/110,229 (5972), 34 pages.
Office Action, dated Oct. 1, 2015, received in U.S. Appl. No. 14/169,002 (5973), 13 pages.
Final Office Action, dated May 3, 2016, received in U.S. Appl. No. 14/169,002(5973), 12 pages.
Office Action, dated Nov. 24, 2015, received in U.S. Appl. No. 14/265,340 (5974), 15 pages.
Notice of Allowance, dated Jul. 7, 2016, received on U.S. Appl. No. 14/265,340 (5974), 8 pages.
Office Action, dated Sep. 24, 2015, received in U.S. Appl. No. 14/046,836 (5977), 10 pages.
Office Action, dated Jul. 6, 2017, received in U.S. Appl. No. 14/603,269 (7248), 22 pages.
Final Office Action, dated Apr. 25, 2018, received in U.S. Appl. No. 14/603,269 (7248), 26 pages.
Notice of Allowance, dated Jan. 23, 2019, received in U.S. Appl. No. 14/603,269 (7248), 11 pages.
Office Action, dated Sep. 22, 2017, received in U.S. Appl. No. 14/732,594 (7274), 37 pages.
Final Office Action, dated Apr. 11, 2018, received in U.S. Appl. No. 14/732,594 (7274), 44 pages.
Notice of Allowance, dated Sep. 4, 2018, received in U.S. Appl. No. 14/732,594 (7274), 4 pages.
Notice of Allowance, dated Sep. 21, 2018, received in U.S. Appl. No. 15/199,672 (7289), 10 pages.
Office Action, dated Jun. 5, 2020, received in U.S. Appl. No. 16/273,025 (7599), 15 pages.
Notice of Allowance, dated Sep. 28, 2020, received in U.S. Appl. No. 16/273,025 (7599), 7 pages.
Office Action, dated Dec. 8, 2020, received in U.S. Appl. No. 16/410,990 (7612), 15 pages.
Final Office Action, dated May 4, 2021, received in U.S. Appl. No. 16/410,990 (7612), 16 pages.
Notice of Allowance, dated Dec. 17, 2021, received in U.S. Appl. No. 16/410,990 (7612), 10 pages.
Office Action, dated Sep. 22, 2021, received in U.S. Appl. No. 17/146,434 (7766), 15 pages.
Extended European Search Report, dated Mar. 19, 2012, received in European Patent Application No. 08832204.5, which corresponds to U.S. Appl. No. 12/234,053, 8 pages.
International Search Report and Written Opinion dated Apr. 28, 2009, received in International Patent Application No. PCT/US2008/077007, which corresponds to U.S. Appl. No. 12/234,053, 5 pages.
International Preliminary Report on Patentability dated Mar. 24, 2010, received in International Patent Application No. PCT/US2008/077007, which corresponds to U.S. Appl. No. 12/234,053, 4 pages.
Extended European Search Report, dated Feb. 29, 2016, received in European Patent Application No. 11804144.1, which corresponds to U.S. Appl. No. 13/171,124, 7 pages.
International Search Report and Written Opinion dated Feb. 9, 2012, received in International Patent Application No. PCT/US2011/042225, which corresponds to U.S. Appl. No. 13/442,855, 6 pages.
International Preliminary Report on Patentability dated Dec. 28, 2012, received in International Patent Application No. PCT/US2011/042225, which corresponds to U.S. Appl. No. 13/442,855, 4 pages.
International Search Report and Written Opinion dated Jul. 30, 2012, received in International Patent Application No. PCT/US2011/062721, which corresponds to U.S. Appl. No. 13/308,416, 7 pages.
International Preliminary Report on Patentability dated Jun. 4, 2013, received in International Patent Application No. PCT/US2011/062721, which corresponds to U.S. Appl. No. 13/308,416, 5 pages.
International Search Report and Written Opinion dated Jul. 20, 2012, received in International Patent Application No. PCT/US2011/062723, which corresponds to U.S. Appl. No. 13/308,428, 7 pages.
International Preliminary Report on Patentability dated Jun. 4, 2013, received in International Patent Application No. PCT/US2011/062723, which corresponds to U.S. Appl. No. 13/308,428, 5 pages.
International Search Report and Written Opinion dated Jul. 27, 2012, received in International Patent Application No. PCT/US2012/000210, which corresponds to U.S. Appl. No. 13/355,450, 7 pages.
International Preliminary Report on Patentability dated Apr. 1, 2013, received in International Patent Application No. PCT/US2012/000210, which corresponds to U.S. Appl. No. 13/355,450, 5 pages.
International Search Report and Written Opinion dated Jan. 10, 2013, received in International Patent Application No. PCT/US2012/040296, which corresponds to U.S. Appl. No. 13/485,802, 7 pages.
International Preliminary Report on Patentability dated Dec. 2, 2013, received in International Patent Application No. PCT/US2012/040296, which corresponds to U.S. Appl. No. 13/485,802, 5 pages.
International Search Report and Written Opinion dated Nov. 29, 2012, received in International Patent Application No. PCT/US2012/000199, which corresponds to U.S. Appl. No. 14/110,229, 7 pages.
International Preliminary Report on Patentability, dated Oct. 8, 2013, received in International Patent Application No. PCT/US2012/000199, which corresponds to U.S. Appl. No. 14/110,229, 5 pages.

* cited by examiner

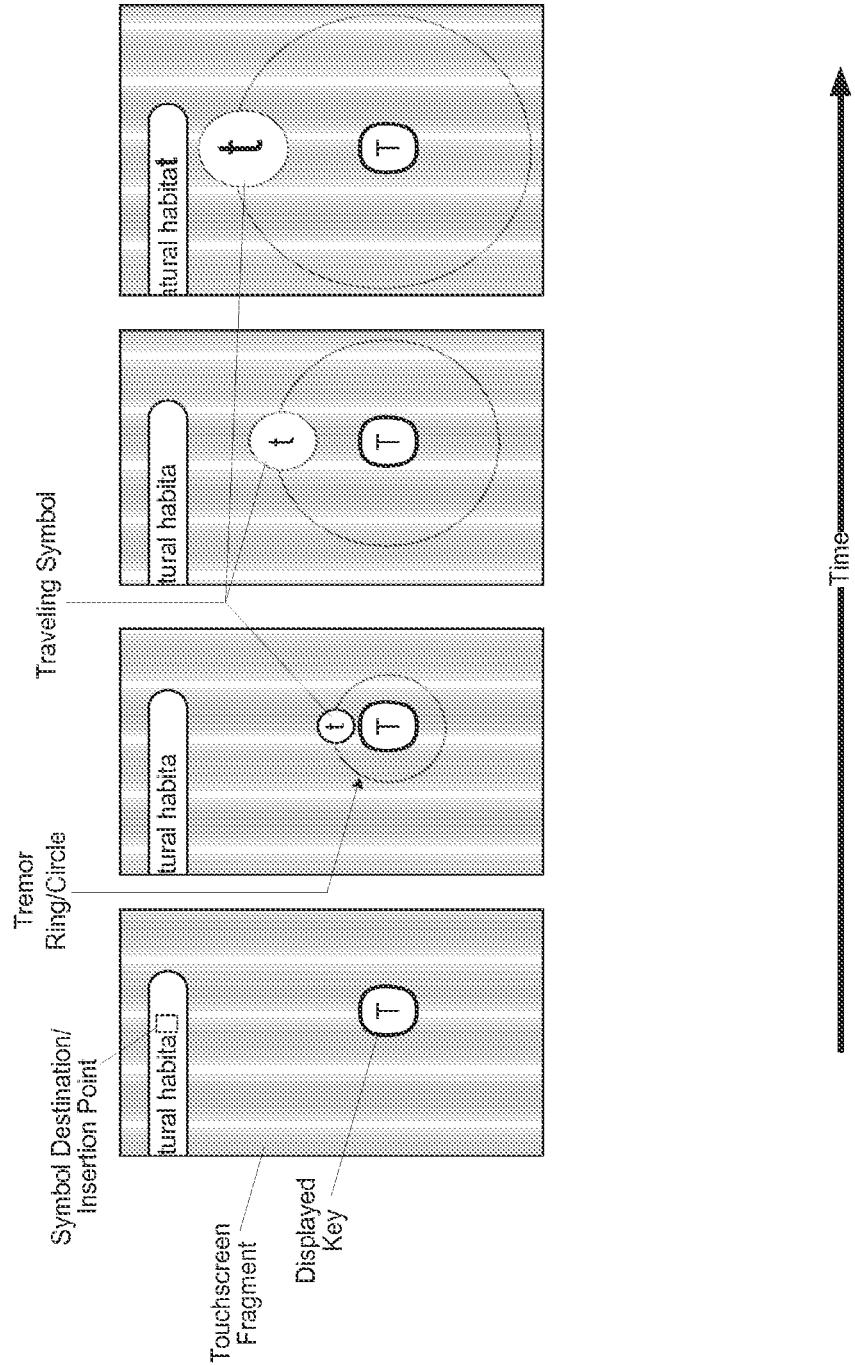

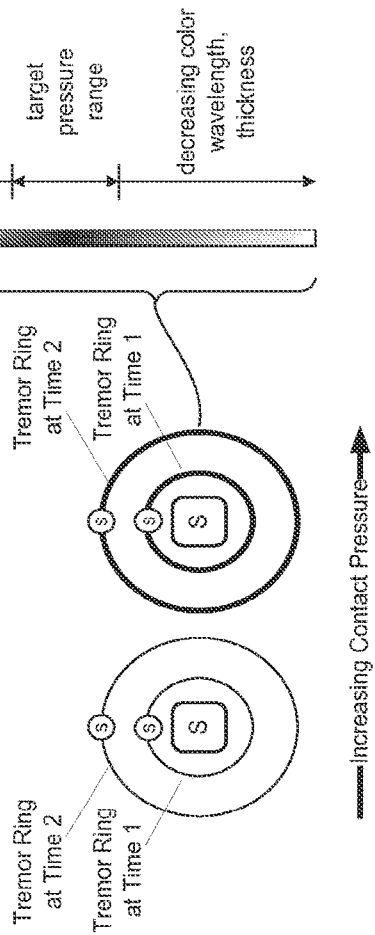
FIG. 2A
Pressure-Sensitive/Impact-Sensitive Ring Expansion Rate
FIG. 2B
Pressure-Sensitive/Impact-Sensitive Ring Intensity (e.g., color, thickness, etc.)
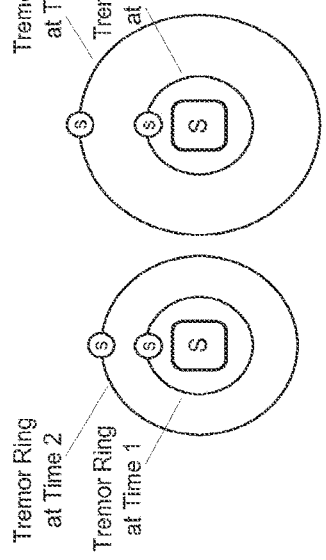
FIG. 3
Tremor Ring Decay
FIG. 4
User- and/or Application-Specified Selection-Animation Parameters
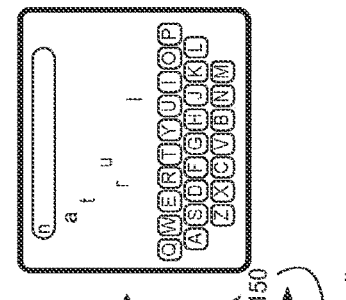
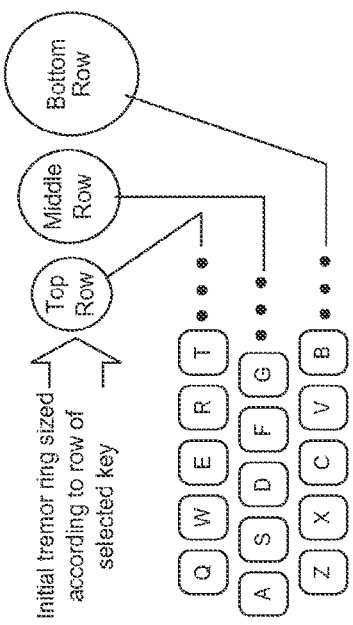
FIG. 5
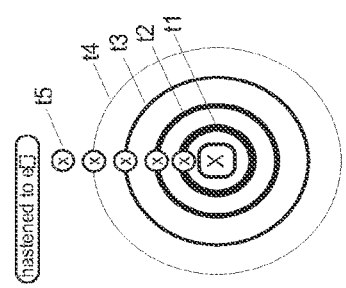

Keyboard bow/deformation in response to detecting rested hands

Local deformation in response to individual keystroke

Semi-transparent keyboard emerges in response to user typing, gesture, etc.

Keyboard fades to invisibility when user input ceases

Limited set of keys emerge in response to user input (predictive, clustered, etc.)

VIRTUAL KEYBOARD ANIMATION

RELATED APPLICATIONS

This application is a continuation of U.S. application Ser. No. 16/410,990, filed May 13, 2019, which is a continuation of U.S. application Ser. No. 14/603,269, filed Jan. 22, 2015, now U.S. Pat. No. 10,289,302, which is a continuation of U.S. application Ser. No. 14/481,882, filed Sep. 9, 2014, now abandoned, which claims priority to U.S. Provisional Application No. 61/875,269 filed Sep. 9, 2013, entitled "Key Selection Confirmation Animation on a Virtual Keyboard", each of which is hereby incorporated by reference in its entirety.

TECHNICAL FIELD

The disclosure herein relates to data processing systems and more particularly to detecting and responding to user input in data processing systems.

INTRODUCTION

Tablet computers, smartphones and other touchscreen devices typically emulate mechanical keyboard functionality by displaying a keyboard image beneath a featureless touch-sensitive surface, compensating for the lack of tactile feel by providing visual feedback when a key is selected. A common "virtual keyboard" technique, for example, is to display the character associated with the selected key directly above and adjacent the key as it is selected. Unfortunately, such visual feedback is often obscured by a user's hands, a problem aggravated by recent advances that enable a user's hands/fingers to be rested on the touchscreen (over the virtual keyboard) without unintended key activation.

BRIEF DESCRIPTION OF THE DRAWINGS

The disclosure herein is illustrated by way of example, and not by way of limitation, in the figures of the accompanying drawings and in which like reference numerals refer to similar elements and in which:

FIG. 1 illustrates an embodiment of a traveling-symbol function within a touchscreen-implemented virtual keyboard;

FIGS. 2A and 2B illustrate embodiments of contact-pressure and/or impact-strength indicia that may be implemented in connection with a traveling-symbol animation;

FIG. 3 illustrates an exemplary decay effect in which an indicia of tremor ring intensity (e.g., line-thickness) changes as the tremor ring propagates away from a struck key;

FIG. 4 illustrates examples of additional key-selection animation features corresponding to respective programmed animation settings;

FIG. 5 illustrates a key-selection animation embodiment in which initial tremor ring size is determined according to locus of a struck key;

DETAILED DESCRIPTION

Figure 6A:
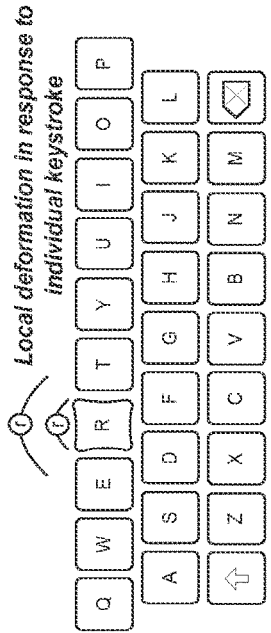
FIGS. 6A and 6B illustrate additional animation effects that may be applied in response to input from computing device sensors.

In a number of embodiments disclosed herein, user key selection in a virtual keyboard is visibly confirmed by displaying a moving image of a symbol corresponding to the selected key such that the symbol moves sufficiently away from the virtual keyboard to be readily visible by a user, despite presence of the user's hands over the virtual keyboard. In one-such "traveling symbol" implementation, the moving symbol appears to ride (sail, fly, glide or otherwise be conveyed, propelled or moved by) by a touch-induced wave, referred to herein as a tremor ring, that emanates from the user contact interpreted as the key selection or key-selection event. In other embodiments, a keyboard image may be rendered in a bowed or otherwise deformed state to signal detection of a user's rested hands or fingers. Individual key selections may then be rendered as a local deformation (e.g., modeling deformations in a stretched rubber sheet, gel or other malleable/semifluid material) such as wavelets traveling toward a symbol insertion point (e.g., text-entry field), conveying or morphing into the typed/selected symbol at the insertion point. In yet other "touch-emergent" keyboard embodiments, a keyboard image (or one or more keys thereof) is temporarily or transiently rendered on an otherwise keyboard-less display in response to user touch-input, with the keyboard image fading to the point of disappearance in the absence of continued touch or typing input. In a number of touch-emergent keyboard implementations, the keyboard image or portion thereof is rendered in a semi-transparent (i.e., non-opaque) state to enable the pre-existing screen image to remain visible to the user, thus enabling the user to quickly enter text or other information without disrupting ongoing interaction with the display (e.g., annotating a video or still image, sending a message while gaming or viewing a motion picture, etc.). These and other features and embodiments are described in further detail below.

FIG. 1 illustrates an embodiment of a traveling-symbol function within a touchscreen-implemented virtual keyboard. In the example shown, one or more sensor signals generated in response to a user contact at the locus of a virtual 'T' key (i.e., image of 'T' key rendered on touchscreen display) are determined by a user-interface (UI) controller to constitute a 'T' key-selection event. In response to detecting the 'T' key selection (i.e., action by the user indicating intent to activate a given key), the UI controller renders, as a graphic image on the touchscreen, a tremor ring (also referred to herein as a tremor circle or tremor wave) that emanates and propagates away from the locus of the 'T' key in an emulation of a wave flowing through the on-screen image, propelling an image of the typed symbol, toward a symbol destination insertion point (e.g., a text entry field). By this operation, the typed character (or more generally, typed symbol) is made visible to the user to confirm detection of the key selection, despite the otherwise obscuring presence of the user's hands over the virtual keyboard. In the particular example shown, the typed symbol grows larger as it travels away from the selected key to enhance visibility, and appears to glide to the insertion point, giving the impression that the T is being transferred from the virtual keyboard to the target text.

FIGS. 2A and 2B illustrate embodiments of contact-pressure and/or impact-strength indicia that may be implemented in connection with a traveling-symbol animation, for example, to aid in user-interface training (i.e., providing feedback to a user for correcting excessive or insufficient typing impact or pressure) and/or distinguishing between different types of user input (e.g., typing vs. tapping/clicking events). In the example of FIG. 2A, the tremor ring propagation rate (or expansion rate or travel rate) increases and decreases in accordance with impact strength (i.e., impulse force or other measure strength of user tap) and/or contact pressure (measure of how hard a user presses after impacting the touch-sensitive surface). Thus, a tremor ring generated in response to an 'S' key selection expands by a first radial distance over a given time interval in response to a first impact strength and/or contact pressure and expands by a second, larger radial distance over that same time interval in response to a higher impact strength/contact pressure. In one embodiment, the radial expansion rate of the ring increases in proportion to the impact/pressure level, while in other embodiments, a limited number of impact and/or pressure thresholds yield a corresponding number of ring expansion rates (i.e., impact/pressure between first and second thresholds yields a first ring expansion rate, impact/pressure between second and third thresholds yields a second ring expansion rate, etc.).

In the embodiment of FIG. 2B, the intensity of the tremor ring varies in accordance with impact strength and/or contact pressure, for example ranging in color and/or line-thickness between minimum and maximum impact/pressure extremes. In the specific example shown, both color and line-thickness vary over a predetermined impact/pressure range, signaling insufficient/excessive impact strength and/or pressure via short/long color wavelength extremes (violet and red) and correspondingly thin/heavy line-thickness, and confirming impact/pressure within a desired range via a mid-range color (e.g., green) and line-thickness. In other embodiments, both ring intensity and ring expansion rate may be employed to signal impact/pressure and/or alternative typing feedback (e.g., level of ambiguity in typed keys, thus permitting a user to adjust/train his or her characteristic typing). For example, ring intensity may correspond to impact strength, while expansion rate corresponds to contact pressure or vice-versa.

FIG. 3 illustrates an exemplary decay effect in which an indicia of tremor ring intensity (e.g., line-thickness) changes as the tremor ring propagates away from the struck key. In the particular example shown, for instance, the line-weight of the tremor ring is progressively reduced from time t1 to t4, disappearing altogether by time t5 even as the selected symbol (the 'x' character in this case) continues to glide visibly toward the insertion point. This decay effect may be used, for example, to signify impact strength and/or contact-pressure intensity (e.g., lower rate of decay for higher impact strength/contact pressure) without unduly obscuring other elements of a rendered scene.

FIG. 4 illustrates additional key-selection animation features and configurations showing, for example, a beam-type wavelet (i.e., directional propagation indicators instead of a complete ring) for a first animation setting ("setting 1"), and a nonvisible or altogether omitted tremor ring (i.e., rendering only the gliding symbol) in a second animation setting ("setting 2"). An operational view 150 of the symbol-only setting ("setting 2") illustrates multiple typed characters in flight simultaneously, all gliding from the virtual keyboard to a text-field insertion point.

FIG. 5 illustrates a key-selection animation embodiment in which initial tremor ring size is determined according to locus of the struck key. For example, keys more likely to be obscured by a user's hands yield larger initial tremor ring sizes (which size variation may also apply to initial size and/or growth rate of traveling symbols) than keys less likely to be obscured. More specifically, in the embodiment shown, keystrokes directed to bottom-row keys (e.g., deemed most likely to be obscured by the user's hands) yield larger initial tremor ring sizes than keystrokes directed to middle-row keys which, in turn, yield larger initial ring sizes than keystrokes direct to top-row keys. This location-indexed animation feature may vary according to the location and orientation of the virtual keyboard. For example, the ring-size variance shown in FIG. 5 may be reversed for a virtual keyboard rendered in a display heading (or otherwise at the top of the display), or may progress from left to right in a virtual keyboard rendered at the side of a display (e.g., a numeric keypad or the like). In all such cases, the touch-or tap-location indexing may be applied to animation features other than ring sizes including, for example and without limitation, size, growth rate and/or rate-of-travel of traveling symbols, ring or beam intensity, ring or beam decay and so forth.

Characteristics of key-selection animation in addition to those described in reference to FIGS. 1-5 include, for example and without limitation:
  the speed at which the tremor circle expands may be linear or nonlinear
  the speed at which the tremor circle expands may be proportional to how hard a key is tapped
  the traveling symbol displayed within or at the periphery of the tremor circle may grow or shrink as the tremor circle expands
  the tremor circle of a selected key may be immediately (or more rapidly) extinguished following selection of a subsequent key, thus avoiding or limiting simultaneous display of multiple tremor circles that might otherwise clutter the user interface As mentioned briefly in reference to FIG. 4, key-selection animation settings or configurations may be specified by a user in connection with a computing device as a whole and/or specific application programs (or "apps") executed by the computing device. For example, a UI controller may access a programming interface (e.g., exposed by the operating system and/or executing application program) to retrieve animation settings to be applied in response to key-selection events, gestures, rested fingers and so forth. Accordingly, an application developer may specify a default set of key-selection animation characteristics to be applied by the UI controller during application execution, and may additionally permit the application user (or a system administrator in an enterprise setting) to tailor the animation characteristics via an interactive configuration display. An operating system developer may similarly specify a default set of key-selection animation characteristics to be applied in absence of application-specified settings, permitting the user to alter the characteristics according to preference in a configuration or "settings" menu. In all such cases, the configuration settings may be stored in a non-volatile memory of the host computing device and thus retained through a device power-cycle event.

Figure 6B:
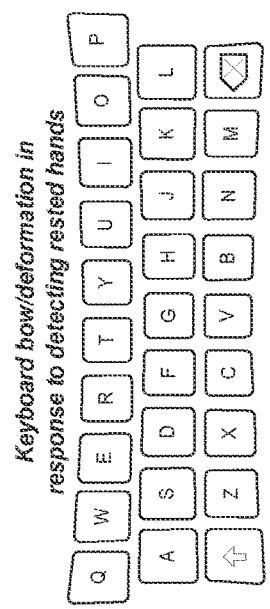

FIGS. 6A and 6B illustrate additional animation effects that may be applied in response to input from computing device sensors (e.g., proximity sensors, pressure sensors, vibration sensors and/or capacitive or other touch sensors as discussed below). More specifically, FIG. 6A illustrates a deformation of the rendered keyboard image (i.e., bowing at the center of the keyboard or anticipated input locus) that may be presented in response to determining/detecting that a user's hands or fingers have been rested on and/or are hovering above the virtual keyboard surface (e.g., as described in U.S. Pat. No. 8,325,121 entitled "Cleanable touch and tap-sensitive surface" and U.S. application Ser. No. 14/265,340 filed Apr. 29, 2014 and entitled "Finger Hover Detection for Improved Typing," each of which is hereby incorporated by reference). FIG. 6B illustrates a local deformation in the rendered keyboard image (e.g., modeled as a deformation in a stretched rubber sheet, gel or other malleable material) in response to an individual key selection. As shown, the local deformation may be accompanied by (i.e., appear to trigger) a wavelet traveling away from the selected key, conveying the typed symbol or morphing into the typed symbol at or near the insertion point.

More generally, any large area deformation, fading, highlighting or other change in the rendered keyboard image may be used to signify resting or hovering of a user's hands or finger(s), with more focused deformations/circles/wavelets or other animation emanating from individual key selections (or combination-key selections) and transforming into a typed symbol. Such image bowing (or other deformation) effectively "advertises" the finger-resting feature, helping users learn and practice resting actions and providing feedback confirming that the feature is working. In contrast to approaches that may be misconstrued as keyboard disablement (e.g., grey-out shading in response to finger-rest detection), a downward bowing, deformation or indentation of an entire rest area indicates the hand resting weight without indicating disablement. Also, because an initial set of touches may not be confirmed as a resting event until additional touches arrive (i.e., a fraction of a second later), the UI controller may initially render an 'ambiguous' animation showing a slight under-finger deformation that, in the case of an eventual resting finger determination, gently diffuses or spreads the deformation over a larger area (e.g., the whole keyboard image) as if the finger energy had just dissipated into the whole surface. By contrast, if after a brief interval (e.g., few tens of milliseconds) the UI controller determines that the initial touches were non-resting key selections, the initially ambiguous animation may be morphed into a crisper, still-localized deformation (e.g., wavelet/circle) under the finger and/or traveling upwards toward the symbol insertion point.

Figure 7:
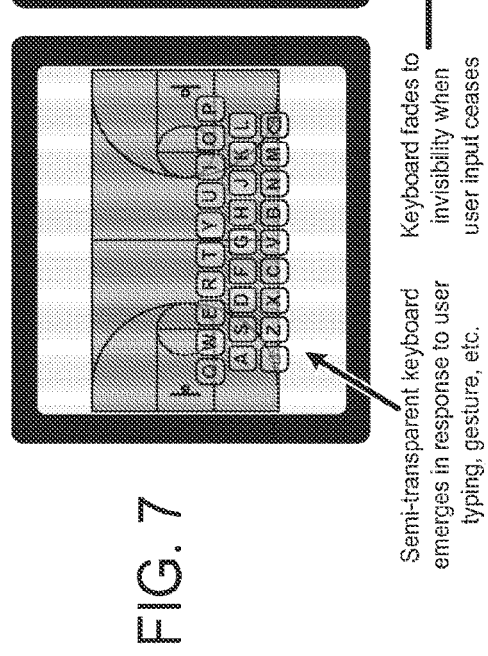
FIGS. 7 and 8 illustrate embodiments of a touch-emergent or transient keyboards.
Figure 8:
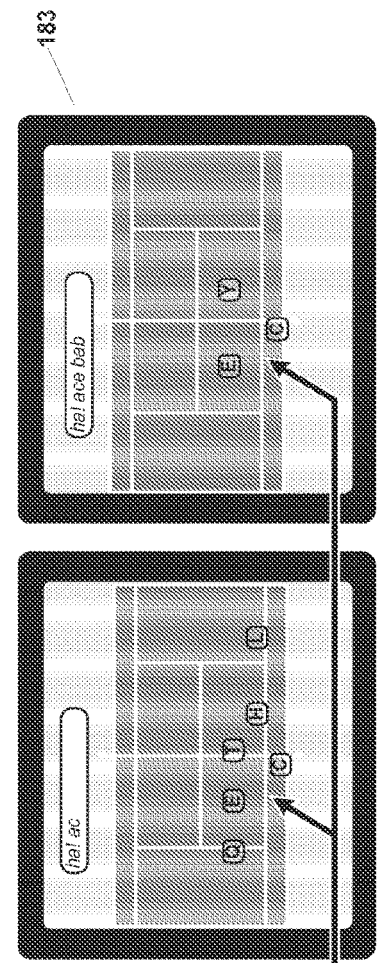

FIGS. 7 and 8 illustrate embodiments of a touch-emergent or transient keyboards—virtual keyboard functions particularly useful in gaming, image-rendering and other content-rich applications that would otherwise be impaired or obscured by a statically displayed virtual keyboard.

FIG. 7 illustrates an touch-emergent keyboard embodiment in which a full virtual keyboard is temporarily and semi-transparently rendered over existing screen content (in this case a basketball court in a gaming application) in response to determining/detecting that:
- a user's fingers are resting on the touchscreen surface or hovering above the touchscreen surface;
- the user has begun typing; and/or
- the user has otherwise entered or made a gesture indicating a desire to enter data via keyboard (including a keypad or other data entry panel).

In one implementation, for example, when the user begins typing or rests a threshold number of fingers concurrently on the touchscreen surface, the virtual keyboard is rendered semi-transparently to enable the user to view the pre-existing content. As the user types, the typed symbols may be rendered unobtrusively (e.g., also in a semi-transparent manner) in another part of the screen while the virtual keyboard remains in view. When the user stops typing or removes his or her hands from the surface or proximity thereto, the virtual keyboard fades, eventually disappearing altogether as shown. The fade rate (or decay rate) may vary according to user gesture, fading more quickly in response to detecting removal of the user's hands than to typing cessation accompanied by resting of the user's hands on the touchscreen. Further, one or more predetermined gestures (tapping on the computing device outside the touchscreen—an event that may be detected by a vibration sensor such as an accelerometer) may be used to signal that the user has finished typing, causing the system to clear the virtual keyboard from the display without delay.

FIG. 8 illustrates a touch-emergent keyboard embodiment in which only a limited set of keys are displayed (again in semi-transparent form) in response to user input (typing, resting fingers, hovering fingers, gestures, etc.) indicating user desire to enter data via keyboard. In the specific example shown, the rendered set of keys (i.e., less than the full set of keys in the virtual keyboard) are those determined to most likely follow the immediately preceding text input sequence (e.g., as determined algorithmically using linguistic or other databases within or accessible by the host computing device, including databases corresponding to events taking place in the application program itself). Thus, in the context of the tennis gaming application shown, the system may determine via one or more linguistic databases, potentially aided by contextual information following, for example, a unreturned tennis-serve, that the most likely next character following the typed expression "ha! ac" is the letter 'e' (to yield "ace"), with a few other less likely possibilities as shown at 181. In the implementation shown, the keys deemed to be the most likely next-strike candidates are rendered as the subset of virtual keys (i.e., 'E' key and five others) without emphasizing one choice over others. In alternative embodiments, the brightness, opacity or other key characteristic may be varied from key to key to emphasize more likely next-strike candidates over less likely candidates. Further, the number of transiently rendered virtual keys may vary from one keystroke to the next according to linguistic context and/or application state. In the screen example shown at 183 in FIG. 8, for instance, only three keys are deemed to be linguistically viable in view of the previously entered text. In one embodiment, the UI controller may switch from transient rendering of a small number of keys (as shown in FIG. 8) to rendering a complete virtual keyboard in response to a predetermined user gesture (e.g., double tapping with four or more fingers simultaneously) and/or data input context (e.g., unable to disambiguate user input or derive linguistic meaning from entered text).

Figure 9:
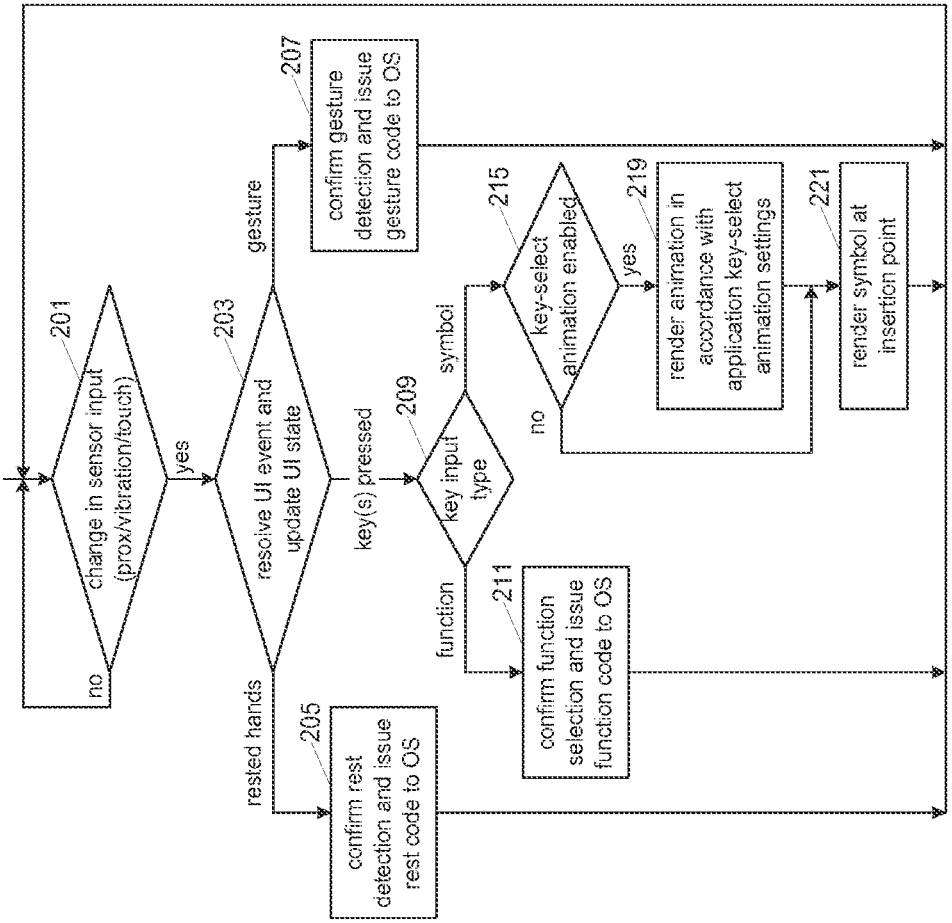
FIG. 9 illustrates exemplary user-interface event resolution and responsive operations that may be executed within a computing device in connection with key-selection animation embodiments and other features described in reference to FIGS. 1-8.

FIG. 9 illustrates exemplary UI-event resolution and responsive operations that may be executed within a computing device in accordance with the embodiments described above. Starting at 201, a UI controller monitors signals from various sensors (e.g., proximity sensor(s), vibration sensors(s), capacitive and/or other types of touch sensors) to determine whether a user's disposition with respect to the user interface has changed—an occurrence referred to herein as a UI event. If the sensor signals indicate a change in the user's disposition (i.e., the signals have changed), the UI controller resolves or qualifies the UI event as shown at 203 as being, for example and without limitation, a rest event (i.e., user has rested his or her hands or removed his or her hands from a resting disposition), a key selection event, or a gesture event. In one embodiment, for instance, the UI controller implements a state machine that resolves the UI event based on a current state (e.g., hands-at-rest state, active-typing state, hands approaching state, etc.) and the immediate sensor input, transitioning from state to state as UI events are resolved.

Continuing with FIG. 9, upon determining that the user has rested his or her hands on the touch-surface, the UI controller confirms the rest detection (e.g., by generating an audible and/or visible confirmation to the user, such as the keyboard image deformation described above in reference to 6A) and outputs a corresponding UI-event code to the operating system at 205 (though not specifically shown, the UI controller may similarly confirm removal of a user's rested hands—restoring the keyboard image to a non-deformed state—and signal the OS of the removal event). Similarly, upon determining that a gesture has been entered, the UI controller confirms the gesture detection and issues a corresponding UI-event code to the operating system as shown at 207.

Upon detecting that one or more keys have been pressed (or tapped or struck), the UI controller distinguishes the key input type at 209 as being a typed symbol or a non-typing function (e.g., a command as may be signaled by pressing a function key and/or a combination of keys that qualify keys otherwise used for typing input). Upon detecting command or other function-request input, the UI controller confirms the function selection and issues a corresponding UI-event code (i.e., indicating the command or requested function) to the OS as shown at 211. By contrast, if symbol input is detected, such as typing an alphanumeric character or other symbol to be rendered at an insertion point within the display, the UI controller determines whether key-selection animation is enabled at 215 (e.g., by evaluating programmed settings associated with an executing application program or operating system) and, if so, renders the key selection animation in accordance with key-selection animation settings (219) as generally described above before displaying the symbol at the insertion point. For example, if key selection animation is enabled, the UI controller may cause traveling symbols with or without associated tremor rings or other conveyance graphics to be displayed in connection with the selected symbol.

Still referring to FIG. 9, upon resolving a particular UI event at 203, including rested hands, specific gestures or key selections, the UI controller may display an otherwise non-visible virtual keyboard or portion thereof, and thus implement the touch-emergent keyboard operations described in reference to FIGS. 7 and 8.

Figure 10:
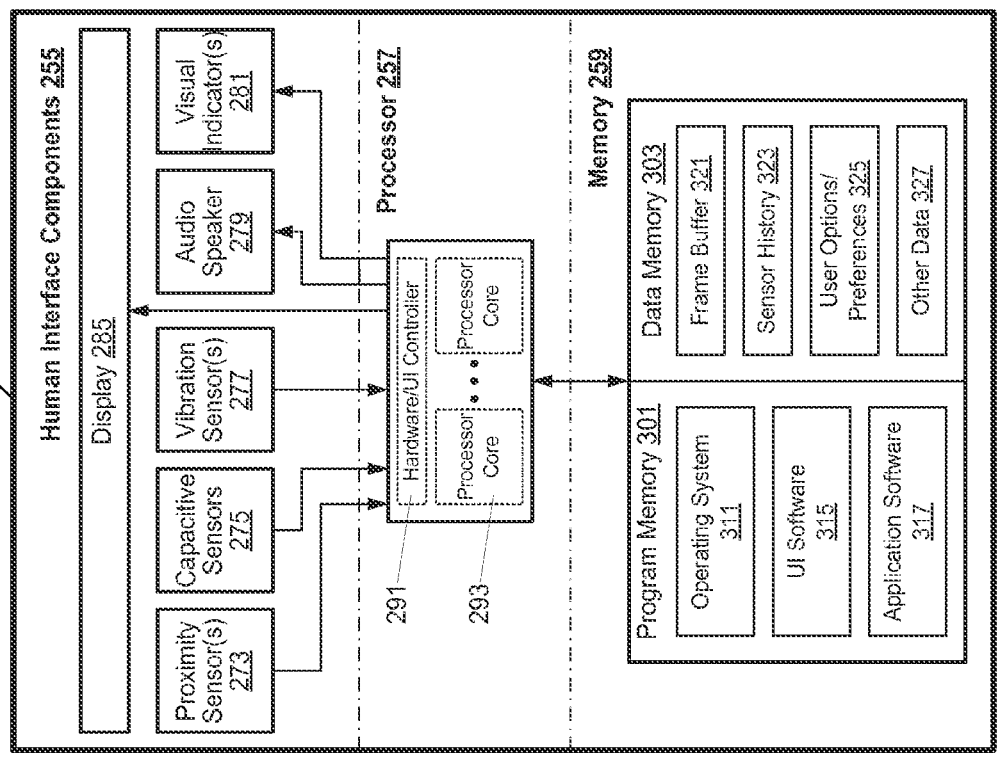
FIG. 10 illustrates an exemplary conceptual diagram of a touch-screen based computing device capable of implementing the various virtual keyboard and user-interface features described in reference to FIGS. 1-9.

FIG. 10 illustrates an exemplary conceptual diagram of a touch-screen based computing device 250 (e.g., smartphone, tablet computer, laptop computer, desktop computer etc.) capable of implementing the various virtual keyboard and user-interface features described above. In the embodiment shown, computing device 250 includes a planar (flat) transparent surface disposed over an enclosure that houses, without limitation, a set of human interface components 255, processor 257 (which may include one or more discrete integrated circuit components or collectively packaged integrated circuit chips), and memory 259 (which may also include one or more discrete and/or collectively packaged integrated circuit chips). Though not specifically shown, computing device 250 may additionally include a power compartment into which one or more batteries or other power sources may be inserted, radio frequency transceivers (or receivers or transmitters) to enable wireless interoperability according to various standard and/or proprietary protocols, and one or more signaling interfaces to enable removable interconnection of peripheral devices such as external power delivery sources, speakers, microphones, printers, magnetic stripe card readers, storage devices or any other useful device.

Turning to the generalized component categories, human interface components 255 may include one or more proximity sensors 273, one or more vibration sensors 277, capacitive (or other types of touch) sensors 275, audio speaker 279, one or more visual indicators 281 (e.g., light-emitting diodes), as well as a display 285 (e.g., based on liquid crystal or other light-emitting or absorptive technology) disposed beneath the transparent planar surface of the computing device. Though not specifically shown, hardware interface components may additionally include a microphone, one or more image sensor/lens arrangements, and various other types of sensors (e.g., one or more pressure sensors).

Still referring to FIG. 10, the sensor components 273, 275 and 277 provide input to processor 257 which is formed, in the example shown, by a hardware or user-interface (UI) controller 291 together with one or more special purpose processor cores (e.g., graphics processor for rendering textures, images and effects on display 285) and/or general purposes processor cores, shown generally at 293. In one embodiment, raw signals generated by the sensors (273, 275, 279) in response to user contact or proximity with the planar surface overlaying display 285 (the planar surface, display and capacitive sensors, at least, constituting a "touchscreen") are interpreted by UI controller 291 and output to processor core(s) 293 in the form of UI event codes indicating key-selection events, resting hands/fingers, gestures, etc. The one or more processor cores 293 communicate with the UI controller 291 to render images on display 285, turn on various indicators 281 (LED or otherwise), output signals for auditory expression via speaker 279 and so forth.

As shown, processor 257 (i.e., UI controller 291 and processor core(s) 293) are coupled to memory 259, which may include a combination of volatile and nonvolatile storage, the latter including read-only and/or writeable memory (e.g., Flash memory, magnetic storage, optical storage, etc.). In the illustrated embodiment, memory 259 includes a program memory 301 (i.e., to store various executable software programs/program code such as application programs, operating system, device drivers and so forth) and data memory 303. More specifically, UI program code 315 (software) which, when executed by UI controller 291 and/or processor core(s) 293, enables raw signals from the proximity, vibration and/or capacitive touch sensors to be resolved or otherwise construed or interpreted as elemental user-input events (e.g., touch events, tap events, proximity events, hover events, finger/rest hand events, etc.) and, based thereon, as corresponding gestures and key selections, is stored within program memory 301, as is operating system code 311 and other application software 317 which may further process user-input events. In one embodiment, for example, UI controller 291 detects elemental user-input events based on sensor input and outputs UI-event codes indicative of gestures, key selections, user-interface state (i.e., resting hands/fingers, hovering hands/fingers, approaching hands/fingers, etc.) to operating system 311 (i.e., to an executed instance thereof). Operating system 311, in return delivers UI-event codes, with or without further processing (e.g., filtering) to executing instances of application programs (i.e., executing processes) to enable responsive action. The operating system and/or executing processes may, for example, revise contents of a display buffer or frame buffer 321 within data memory 303 to render various images and effects via display 285 (including the various animation effects and touch-emergent keyboard images described above), generate user-visible notifications via indicators 281, generate audible output via speaker 279, transmit signals via wired and/or wireless interfaces and so forth, with all such UI-event-responsive actions ultimately being effected via instruction execution within the UI controller and/or processor core(s) of processor 257. The operating system and/or executing processes may also access (read or write) records or databases of UI events (including elemental user-input events) within a sensor history array 323, various user or application-defined options/preferences 325 and or other application or operating system data 327 within data memory 303. For example, records within the sensor history array 323 may be used to establish an operating state of the user-interface for purposes of detecting/interpreting subsequent UI events, transitioning computing device 250 into or out of one or more low power operating modes (e.g., to conserve battery power) and so forth.

As a user's fingers come into contact with the flat planar surface, capacitive touch sensors 275 generate corresponding "touch" signals (i.e., are "activated"). Processor 257 periodically or responsively samples the status of each touch sensor and stores the result in data memory 259. Through execution of operating system software 311 and/or UI software 315, processor 257 ascertains the location of each activated touch sensor and maps it location to a function, such as a virtual keyboard key, or other icon or construct rendered in display 285. Similarly, the processor 257 may execute UI software and/or operating system software to monitor the status of vibration sensor(s) 277 to detect user taps (i.e., user contact that exceeds a predetermined or programmed impact threshold) on the planar surface, for example, in connection with key-selection events, gestures or other user input. When a valid tap is detected processor 257 may perform, through software execution, algorithmic analysis of the sensor data contained in memory 259 to determine which area of the planar surface was tapped on, and thus resolve the tap event and one or more temporally correlated touch events as a "tap-touch" event and thus as a higher-level user input event (e.g., key selection or gesture) or component thereof.

In one embodiment, at least one of the one or more vibration sensors 277 is implemented by an accelerometer capable of detecting and signaling motion of computing device 250 and thus enabling responsive operation by processor 257. For example, upon determining that the computing device is being moved, processor 257 (through execution of UI software 315 and/or operating system software 311) may temporarily suspend reception of user-input via a virtual keyboard until the motion stops, thus avoiding interpretation of inadvertent user taps or touches as keystrokes or gesture input while the computing device is being moved and freeing the user to touch anywhere on the touch-sensitive surface (i.e., while moving the device).

Any of the various methodologies disclosed herein and/or user interfaces for configuring and managing same may be implemented by machine execution of one or more sequences instructions (including related data necessary for proper instruction execution). Such instructions may be recorded on one or more computer-readable media for later retrieval and execution within one or more processors of a special purpose or general purpose computer system or consumer electronic device or appliance, such as the computing device described in reference to FIG. 10. Computer-readable media in which such instructions and data may be embodied include, but are not limited to, non-volatile (non-transitory) storage media in various forms (e.g., optical, magnetic or semiconductor storage media) and carrier waves that may be used to transfer such instructions and data through wireless, optical, or wired signaling media or any combination thereof. Examples of transfers of such instructions and data by carrier waves include, but are not limited to, transfers (uploads, downloads, e-mail, etc.) over the Internet and/or other computer networks via one or more data transfer protocols (e.g., HTTP, FTP, SMTP, etc.).

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific dimensions, form factors, component circuits or devices and the like can be different from those described above in alternative embodiments. Additionally, links or other interconnection between system components or internal circuit elements or blocks may be shown as buses or as single signal lines. Each of the buses can alternatively be a single signal line, and each of the single signal lines can alternatively be buses. The terms "connected," "interconnected" and "coupled" are used herein to express a direct connection as well as a connection through one or more intervening circuits or structures. Device "programming" can include, for example and without limitation, loading a control value into a register or other storage circuit within an integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A method, comprising:
   at a computing device with a touch-sensitive display:
   displaying a menu for a touch-sensitive keyboard, wherein the menu includes a plurality of keyboard settings;
   detecting a first input in the menu that adjusts a first keyboard setting of the plurality of keyboard settings for a first application of a plurality of applications;
   in response to the first input, adjusting the first keyboard setting for the first application;
   while continuing to display the menu, detecting a second input in the menu that adjusts a second keyboard setting of the plurality of keyboard settings for a second application of the plurality of applications, wherein the second application is different from the first application; and in response to the second input, adjusting the second keyboard setting for the second application.

2. The method of claim 1, wherein the plurality of keyboard settings includes at least one keyboard setting that, when selected, adjusts an animation displayed at the touch-sensitive keyboard in response to an input at the touch-sensitive keyboard.

3. The method of claim 1, wherein the first keyboard setting is different from the second keyboard setting.

4. The method of claim 1, wherein the plurality of keyboard settings includes at least one default keyboard setting for at least one application of the plurality of applications.

5. The method of claim 1, wherein the plurality of keyboard settings includes at least one application-specific keyboard setting.

6. The method of claim 1, wherein the plurality of keyboard settings includes at least one system-level keyboard setting.

7. The method of claim 1, wherein:

adjusting the first keyboard setting for the first application includes overriding a system-level keyboard setting with an application-specific keyboard setting; and adjusting the second keyboard setting for the second application includes overriding a system-level keyboard setting with an application-specific keyboard setting.

8. The method of claim 1, wherein:

adjusting the first keyboard setting for the first application does not adjust the second keyboard setting in the second application; and adjusting the second keyboard setting for the second application does not adjust the first keyboard setting in the first application.

9. A computing device, comprising:

a touch-sensitive display;

one or more processors; and memory storing executable instructions that, when executed by the one or more processors, cause the computing device to:

display a menu for a touch-sensitive keyboard, wherein the menu includes a plurality of keyboard settings;

detect a first input in the menu that adjusts a first keyboard setting of the plurality of keyboard settings for a first application of a plurality of applications;

in response to the first input, adjust the first keyboard setting for the first application;

while continuing to display the menu, detect a second input in the menu that adjusts a second keyboard setting of the plurality of keyboard settings for a second application of the plurality of applications, wherein the second application is different from the first application; and in response to the second input, adjust the second keyboard setting for the second application.

10. The computing device of claim 9, wherein the plurality of keyboard settings includes at least one keyboard setting that, when selected, adjusts an animation displayed at the touch-sensitive keyboard in response to an input at the touch-sensitive keyboard.

11. The computing device of claim 9, wherein the first keyboard setting is different from the second keyboard setting.

12. The computing device of claim 9, wherein the plurality of keyboard settings includes at least one default keyboard setting for at least one application of the plurality of applications.

13. The computing device of claim 9, wherein the plurality of keyboard settings includes at least one application-specific keyboard setting.

14. The computing device of claim 9, wherein the plurality of keyboard settings includes at least one system-level keyboard setting.

15. The computing device of claim 9, wherein:

adjusting the first keyboard setting for the first application includes overriding a system-level keyboard setting with an application-specific setting; and adjusting the second keyboard setting for the second application includes overriding a system-level keyboard setting with an application-specific keyboard setting.

16. The computing device of claim 9, wherein:

adjusting the first keyboard setting for the first application does not adjust the second keyboard setting in the second application; and adjusting the second keyboard setting for the second application does not adjust the first keyboard setting in the first application.

17. A non-transitory computer-readable storage medium storing executable instructions that, when executed by a computing device with a touch-sensitive display, cause the computing device to:

display a menu for a touch-sensitive keyboard, wherein the menu includes a plurality of keyboard settings;

detect a first input in the menu that adjusts a first keyboard setting of the plurality of keyboard settings for a first application of a plurality of applications;

in response to the first input, adjust the first keyboard setting for the first application;

while continuing to display the menu, detect a second input in the menu that adjusts a second keyboard setting of the plurality of keyboard settings for a second application of the plurality of applications, wherein the second application is different from the first application; and in response to the second input, adjust the second keyboard setting for the second application.

18. The non-transitory computer-readable storage medium of claim 17, wherein the plurality of keyboard settings includes at least one keyboard setting that, when selected, adjusts an animation displayed at the touch-sensitive keyboard in response to an input at the touch-sensitive keyboard.

19. The non-transitory computer-readable storage medium of claim 17, wherein the first keyboard setting is different from the second keyboard setting.

20. The non-transitory computer-readable storage medium of claim 17, wherein the plurality of keyboard settings includes at least one default keyboard setting for at least one application of the plurality of applications.

21. The non-transitory computer-readable storage medium of claim 17, wherein the plurality of keyboard settings includes at least one application-specific keyboard setting.

22. The non-transitory computer-readable storage medium of claim 17, wherein the plurality of keyboard settings includes at least one system-level keyboard setting.

23. The non-transitory computer-readable storage medium of claim 17, wherein:

the instructions that cause the computing device to adjust the first keyboard setting for the first application further cause the computing device to override a system-level keyboard setting with an application-specific keyboard setting; and the instructions that cause the computing device to adjust the second keyboard setting for the second application further cause the computing device to override a system-level keyboard setting with an application-specific keyboard setting.

24. The non-transitory computer-readable storage medium of claim 17, wherein:

the instructions that cause the computing device to adjust the first keyboard setting for the first application further cause the computing device to not adjust the second keyboard setting in the second application; and the instructions that cause the computing device to adjust the second keyboard setting for the second application further cause the computing device to not adjust the first keyboard setting in the first application.

* * * * *